United States Patent
Kortum et al.

(10) Patent No.: US 7,406,207 B2
(45) Date of Patent: *Jul. 29, 2008

(54) MULTI-POINT PREDICTIVE FOVEATION FOR BANDWIDTH REDUCTION OF MOVING IMAGES

(75) Inventors: Philip Ted Kortum, Austin, TX (US); Marc Andrew Sullivan, Austin, TX (US)

(73) Assignee: AT&T Intellectual Property 1, L.P., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 11/820,696

(22) Filed: Jun. 20, 2007

(65) Prior Publication Data

US 2007/0248273 A1      Oct. 25, 2007

Related U.S. Application Data

(63) Continuation of application No. 11/313,335, filed on Dec. 21, 2005, now Pat. No. 7,251,373, which is a continuation of application No. 10/123,061, filed on Apr. 15, 2002, now Pat. No. 7,010,169.

(51) Int. Cl.
  *G06K 9/36*     (2006.01)
(52) U.S. Cl. .................................................. 382/239
(58) Field of Classification Search ......... 382/232–233, 382/238–240, 236, 243, 244–252; 348/384.1, 348/387.1, 390.1; 375/240, 240.01
  See application file for complete search history.

(56) References Cited

U.S. PATENT DOCUMENTS

| | | | |
|---|---|---|---|
| 5,282,255 A | 1/1994 | Bovik et al. | |
| 6,014,653 A | 1/2000 | Thaler | |
| 6,090,051 A | 7/2000 | Marshall | |
| 6,182,114 B1 | 1/2001 | Yap et al. | |
| 6,252,989 B1 | 6/2001 | Geisler et al. | |
| 6,351,335 B1 | 2/2002 | Perlin | |
| 6,389,169 B1 | 5/2002 | Stark et al. | |
| 6,417,861 B1 | 7/2002 | Deering et al. | |
| 6,424,343 B1 | 7/2002 | Deering et al. | |
| 6,426,755 B1 | 7/2002 | Deering | |
| 6,670,963 B2 | 12/2003 | Osberger | |
| 6,829,391 B2 | 12/2004 | Comaniciu et al. | |
| 6,836,569 B2 | 12/2004 | Le Pennec et al. | |
| 6,850,236 B2 | 2/2005 | Deering | |
| 6,876,361 B2 | 4/2005 | Venkataraman | |
| 7,010,169 B2 * | 3/2006 | Kortum et al. | 382/239 |
| 7,251,373 B2 * | 7/2007 | Kortum et al. | 382/239 |

(Continued)

OTHER PUBLICATIONS

Anup Basu, et al., "*Enhancing Videoconferencing Using Spatially Varying Sensing*", IEEE Transactions on Systems, Man, and Cybernetics—Part A: Systems and Humans, vol 28, No 2, Mar. 1998, pp. 137-148.

(Continued)

*Primary Examiner*—Jose L. Couso
(74) *Attorney, Agent, or Firm*—Brinks Hofer Gilson & Lione

(57) ABSTRACT

A scene of an image sequence is transmitted that has been compressed using a number of foveation zones, each foveation zone being weighted based on a probability of a viewer looking at a corresponding portion of the first scene.

15 Claims, 3 Drawing Sheets

U.S. PATENT DOCUMENTS

| | | | |
|---|---|---|---|
| 2001/0017651 | A1 | 8/2001 | Baker et al. |
| 2001/0028352 | A1 | 10/2001 | Naegle et al. |
| 2001/0033287 | A1 | 10/2001 | Naegle et al. |
| 2001/0055025 | A1 | 12/2001 | Deering et al. |
| 2002/0003543 | A1 | 1/2002 | Deering |
| 2002/0005862 | A1 | 1/2002 | Deering |
| 2002/0015041 | A1 | 2/2002 | Naegle et al. |
| 2002/0064317 | A1 | 5/2002 | Comaniciu et al. |

OTHER PUBLICATIONS

Zhou Wang, et al., "*Embedded Foveation Image Coding*", IEEE Transactions On Image Processing, vol. 10, No. 10, Oct. 2001, pp. 1397-1410.

Deepak Agarwal, et al., "*Estimating Rates of Rare Events at Multiple Resolutions*", KDD '07 San Jose, CA, pp. 9.

\* cited by examiner

MULTI-POINT PREDICTIVE FOVEATION FOR BANDWIDTH REDUCTION OF MOVING IMAGES

RELATED APPLICATIONS

The present patent document is a continuation of U.S. patent application Ser. No. 11/313,335, filed Dec. 21, 2005, now U.S. Pat. No. 7,251,373 which is a continuation of U.S. patent application Ser. No. 10/123,061, filed Apr. 15, 2002, now U.S. Pat. No. 7,010,169 the entirety of each of which is hereby incorporated by reference.

BACKGROUND

1. Field of the Invention

The present invention relates to image compression methods which use foveation.

2. Description of the Related Art

Foveation is a compression method in which an image is compressed so that it matches an ability of a human visual system to detect detail in a peripheral visual field. Methods of image compression using foveation are disclosed in U.S. Pat. No. 6,252,989 to Geisler and Kortum. Foveation is a powerful method of image compression because of high compression rates and perceptually lossless images which result. Drawbacks of the method include requiring real-time knowledge of where a user is looking, and not easily supporting multi-viewer environments.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Embodiments of the present invention employ multiple zones of foveation which facilitates use in a multi-viewer environment without real-time knowledge of each viewer's gaze. Each foveation zone is weighted based on a probability of a viewer looking at a specific location in a scene. Center points of the foveation zones may be determined either algorithmically or empirically. Implementation of the multi-point foveation compression scheme allows movies of significantly higher quality to be delivered over a telecommunication network, such as a Digital Subscriber Line (DSL) network, without a corresponding increase in required bandwidth.

Embodiments of the present invention are described with reference to FIG. 1, which is a flow chart of an embodiment of a method of multi-point predictive foveation, and FIG. 2, which is a block diagram of an embodiment of a system for multi-point predictive foveation. Consider an image sequence 10 depicted in FIG. 2. Examples of the image sequence 10 include, but are not limited to, all or part of a television program, a movie, a live video event, an output of a Web camera, and other video events which provide moving images. The events captured in the image sequence 10 may be either live or recorded.

The image sequence 10 comprises a plurality of scenes. For example, the image sequence 10 may include scenes 12, 14, 16 and 20. The different scenes may be defined by different cameras, different perspectives of a camera, different periods in time, different locations, and/or different objects captured in the images. As depicted in FIG. 2, the different scenes 12, 14, 16 and 20 may consist of different numbers of images and/or have different lengths of time.

The image sequence 10 is to be compressed either to reduce a bandwidth required to transmit a compressed version thereof or to reduce an amount of data required to store the compressed version thereof. For example, the compressed version may be transmitted by a telecommunication network 22 to one or more viewers. Examples of the telecommunication network 22 include, but are not limited to, a digital subscriber line (DSL) network, a digital cable television transmission network, a satellite transmission network, and a computer network such as an internet or an intranet. Alternatively, the compressed version may be stored to a storage device 24. Examples of the storage device 24 include, but are not limited to, an optical storage medium such as a digital video disk (DVD) or a compact disk (CD), a magnetic storage medium such as a magnetic disk, and an electronic storage medium such as a memory card.

Figure 1:
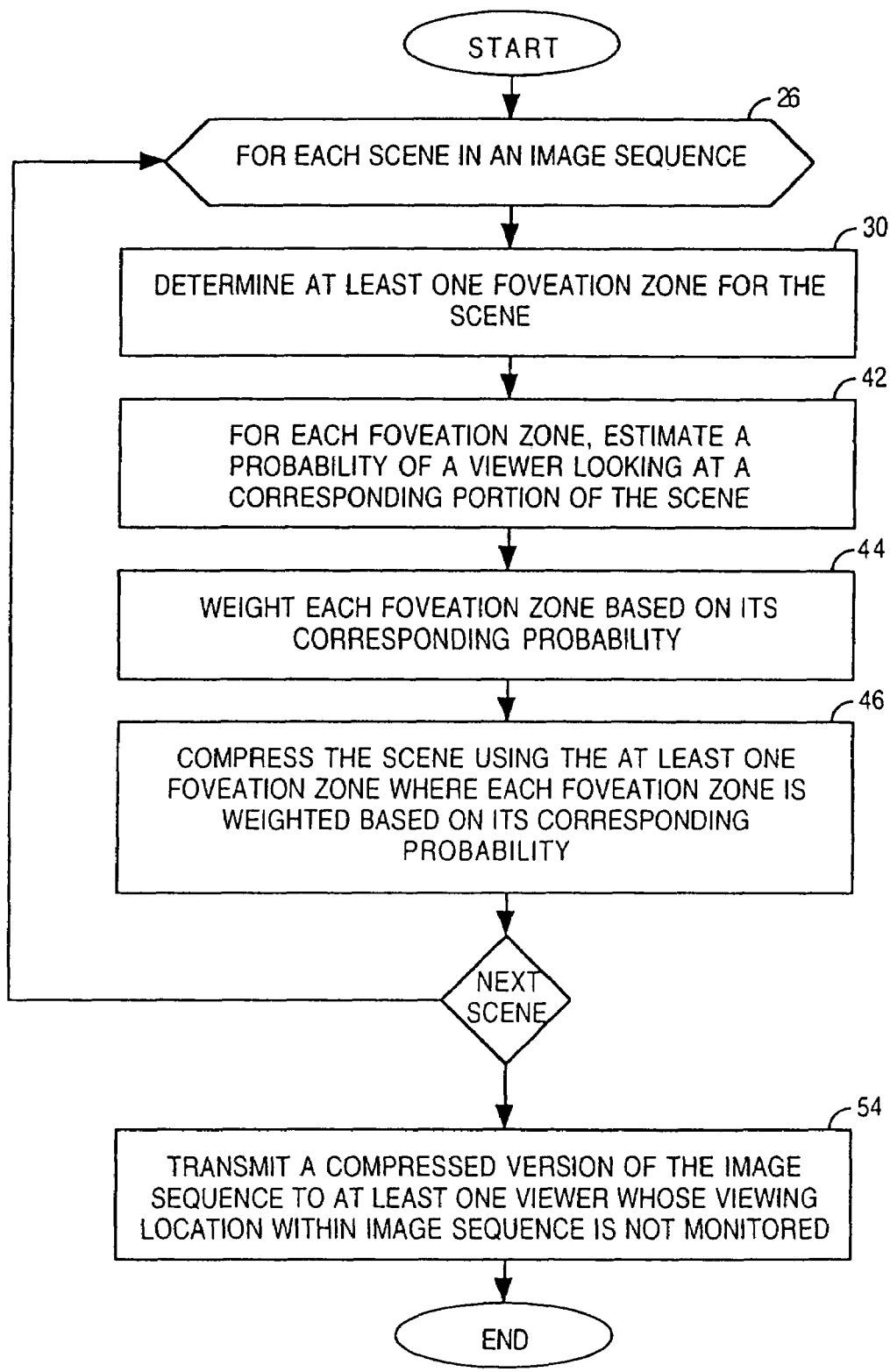
FIG. 1 is a flow chart of an embodiment of a method of multi-point predictive foveation.
Figure 2:
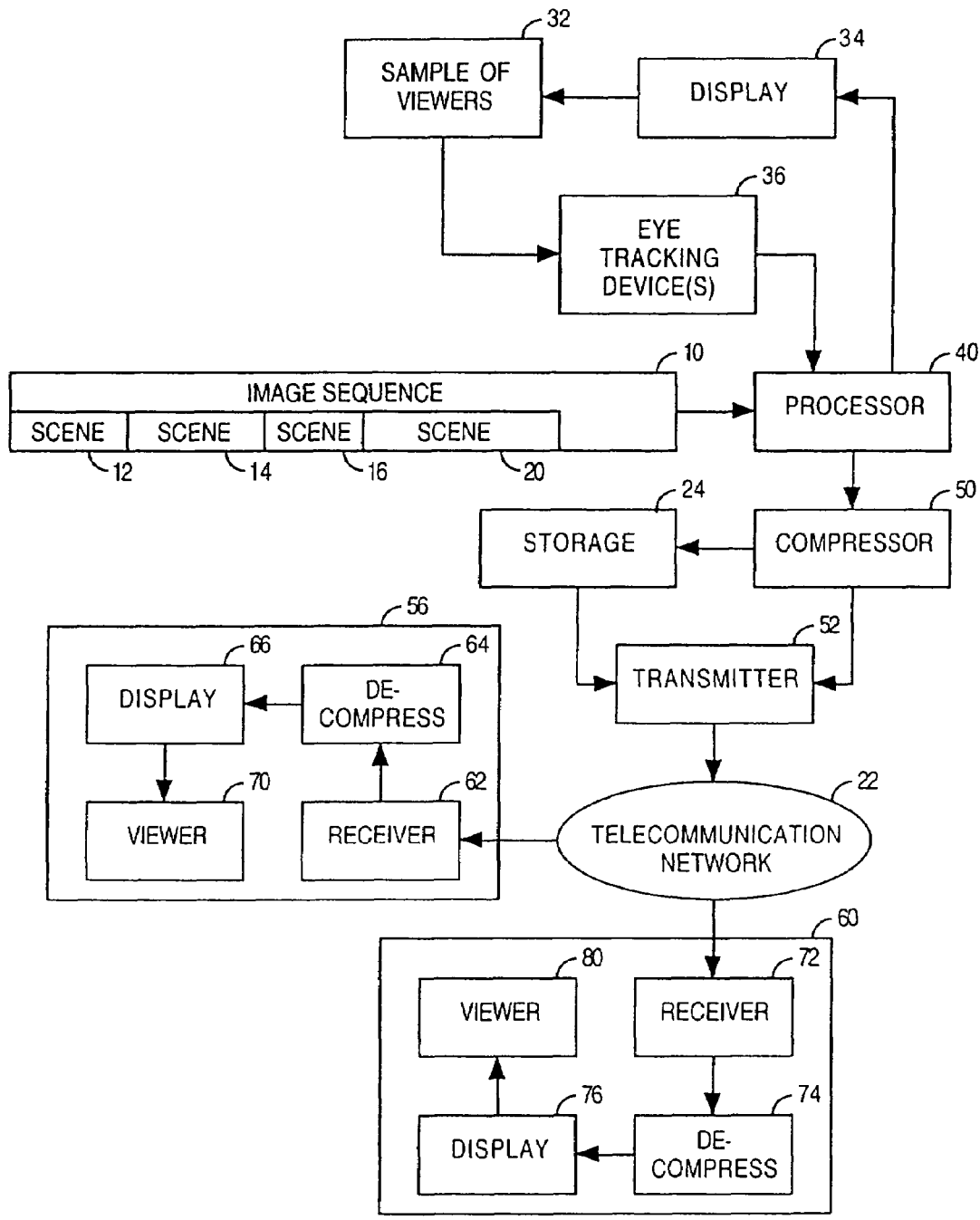
FIG. 2 is a block diagram of an embodiment of a system for multi-point predictive foveation.

Referring to block 26 in FIG. 1, a series of acts is performed for each scene in the image sequence 10. As indicated by block 30, an act of determining at least one foveation zone is performed for a scene in the image sequence 10. Each foveation zone may be determined either empirically or algorithmically.

To empirically determine the foveation zones, the image sequence 10 is displayed to a sample of viewers 32 using a display device 34. One or more eye tracking devices 36 sense where within each of the different scenes each of the viewers 32 is viewing. For the purpose of this disclosure, the portion of a scene that a viewer is viewing is called a "view location". The viewers 32 may be either simultaneously watching the image sequence 10 or watching the image sequence 10 at different times.

The view locations within each scene are determined for the sample of viewers 32 using the eye tracking devices 36. A processor 40 is responsive to view location data from the eye tracking devices 36 to determine one or more foveation zones for each scene. The processor 40 determines the foveation zones based on clusters of the view locations.

To algorithmically determine the foveation zones, the sample of viewers 32, the display 34, and the eye tracking devices 36 may be omitted. In contrast, the foveation zones are determined based on a scene type and objects in the scene. The processor 40 performs acts to determine the foveation zones based on computer program code which assists in recognizing the scene type and objects in the scene. Examples of different scene types include, but are not limited to, a high action scene and a conversation scene. Examples of different objects in a scene include, but are not limited to, humans in a scene, and moving objects in a scene. The processor 40 may assign one foveation zone to each high action scene, and two foveation zones to a conversational scene between two people, for example.

To illustrate the determination of different foveation zones, consider the scenes 12, 14, 16 and 20 in the image sequence 10. For purposes of illustration and example, the scene 12 comprises a sequence of images of having two main foreground objects—a human and a dog in a room; the scene 14 comprises a sequence of images of a conversation between the human and another human in the room; the scene 16 comprises a sequence of images of a fight between the two humans in the room; and the scene 20 comprises a sequence of images of the human running out of the room after the fight.

Either empirically or algorithmically, it is determined in the above example that: the scene 12 has two foveation zones—one for the human and one for the dog; the scene 14 has two foveation zones—one for each human; the scene 16 has one foveation zone at a central portion of the fighting action; and the scene 20 has one foveation zone which follows the human as he runs out of the room.

In general, an image sequence will have scenes with different numbers of foveation zones. In other words, some scenes will have either more or fewer foveation zones than other scenes in the image sequence. Also, it is noted that some scenes may have three or more foveation zones.

As indicated by block 42, a corresponding probability of a viewer looking at a corresponding portion of the scene is estimated for each foveation zone. Each probability may be determined either empirically or algorithmically. Empirically, the probability may be based on the proportion of the viewers 32 whose view locations are within a corresponding foveation zone. Algorithmically, the probability may be determined by the processor 40 based on an expected proportion of viewers whose view locations will be within a corresponding foveation zone. The expected proportion may based on the scene type and objects in the scene.

Continuing with the above example, either empirically or algorithmically the following probabilities are assigned to the various foveation zones in the image sequence 10. In the scene 12, the foveation zone associated with the human has a probability of 0.8 and the foveation zone associated with the dog has a probability of 0.1. In the scene 14, the foveation zone associated with the human has a probability of 0.5 and the foveation zone associated with the other human is 0.5. In the scene 16, the single foveation zone has a probability of about 1. In the scene 20, the single foveation zone has a probability of about 1.

As indicated by block 44, the method comprises weighting each foveation zone based on its corresponding probability. The foveation zones are weighted so that more resolution is associated with portions of the scenes having a greater probability of being viewed. In general, the foveation zones may be definable by either a continuous falloff function or a discrete function. Examples of specific types of foveation functions are disclosed in U.S. Pat. No. 6,252,989 to Geisler and Kortum, which is hereby incorporated by reference into the present disclosure.

For a continuous falloff function, each foveation zone may have a corresponding half-resolution constant based on the probability of a viewer looking at the corresponding portion of the scene. Thus, for a scene having a first foveation zone and a second foveation zone, where the first foveation zone has a greater probability of a viewer looking at its corresponding portion than the second foveation zone, the half-resolution constant of the first foveation zone is greater than the half-resolution constant of the second foveation zone. For example, in the scene 12, the half-resolution constant associated with the human is greater than the half-resolution constant associated with the dog.

For a discrete falloff function, each foveation zone may have a corresponding fixed resolution based on the probability of a viewer looking at the corresponding portion of the scene. Thus, for a scene having a first foveation zone and a second foveation zone, where the first foveation zone has a greater probability of a viewer looking at its corresponding portion than the second foveation zone, the resolution of the first foveation zone is greater than the resolution of the second foveation zone. For example, in the scene 12, the resolution of the human may be fixed at 2400-by-1100 pixels, the resolution of the dog may be fixed at 1200-by-700 pixels, and the resolution of the remainder of scene may be fixed at 640-by-480.

As indicated by block 46, the method comprises compressing each scene using its corresponding at least one foveation zone. The act of compressing is performed by a compressor 50. By compressing all of the scenes, the compressor 50 generates a compressed version of the image sequence 10. The compressed version may be stored to the storage device 24 and/or transmitted (block 52) by a transmitter 54 in communication with the telecommunication network 22. Examples of the transmitter 54 include, but are not limited to, a modem, a computer network interface, a radio frequency transmitter, an optical transmitter, and other wireless and wireline transmitters.

For purposes of illustration and example, consider the telecommunication network 22 comprising a DSL network, and the image sequence 10 comprising a movie. The compressed version of the movie is communicated via the DSL network to a plurality of different viewer's premises, including a viewer's premise 56 and a viewer's premise 60. The premise 56 has a receiver 62 which receives the compressed version via the DSL network, an optional decompressor 64 which decompresses the compressed version, and a display 66 to display the movie to a viewer 70. Similarly, the premise 60 has a receiver 72 which receives the compressed version via the DSL network, an optional decompressor 74 which decompresses the compressed version, and a display 76 to display the movie to a viewer 80. In general, each of the receivers 62 and 72 may be embodied by a modem, a computer network interface, a radio frequency receiver, an optical receiver, or other wireless or wireline receivers. Each of the optional decompressors 64 and 74 may be embodied by a general purpose computer, for example. Each of the displays 66 and 76 may be embodied by a computer monitor or a television, for example.

Typically, the decompressors 64 and 74 are used in embodiments where the image sequence is compressed by both foveated compression and another form of compression, e.g. an MPEG (Moving Pictures Expert Group) standard such as MPEG4. However, in embodiments where the image sequence is compressed using substantially only foveated compression, the decompressors 64 and 74 may be omitted.

It is noted that the viewers' 70 and 80 view locations within the movie are not necessarily monitored by eye tracking devices. Thus, the compression of the movie is independent of viewing behavior of the viewers 70 and 80. However, the compression of the movie is based on a predicted behavior of the viewers 70 and 80. For example, in the scene 12, the viewer 70 may be looking at the human while the viewer 80 is looking at the dog. For a typical movie, the entire movie is compressed based on the eye behavior of the sample of viewers 32 before the viewers 70 and 80 have access to the movie. However, in live event applications, the video may be compressed in real-time based on the eye behavior of the sample of viewers 32. Thus, the viewers 70 and 80 would have a slightly-delayed access to the compressed version of the live video.

Figures 3, 4, 5:
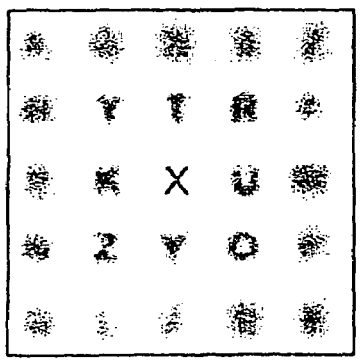
FIG. 3 shows an example of an unfoveated image.
FIG. 4 shows the image with a simulated single point foveation.
FIG. 5 shows the image with a simulated multipoint foveation.

FIGS. 3 to 5 illustrate how different numbers of foveation zones affect an image. FIG. 3 shows an example of an unfoveated image. FIG. 4 shows the same image with a simulated single point foveation at the "X". The resulting foveation zone about the "X" is more detailed than the remainder of the image. Further, the foveation zone is defined by a continuous falloff function which matches the ability of the human visual system to detect detail in the peripheral visual field. FIG. 5 shows the same image with a simulated multi-point foveation. One point of foveation is at the "X" and another point of foveation at the "A". The resulting foveation zones about the "X" and "A" are more detailed than the remainder of the image. In a dynamic environment and at a proper viewing distance, all three of these images would look substantially identical to a viewer whose gaze is directed toward the "X".

It is noted that the processor 40 disclosed herein may be provided by a general purpose microprocessor or a custom processor. The functionality provided by the processor 40 may be implemented in hardware and/or software. The processor 40 may be responsive to a computer-readable medium having computer-readable instructions such as computer program code to direct the acts described with reference to FIG. 1. Typically, the processor 40 is provided by either a general purpose computer system or an application-specific computer system, which is also programmed to provide the functionality of the compressor 50.

It will be apparent to those skilled in the art that the disclosed inventions may be modified in numerous ways and may assume many embodiments other than the preferred forms specifically set out and described herein. For example, the acts described with reference to FIG. 1 may be performed in an order which differs from the order shown in the flow chart. Further, some of the acts may be performed in parallel.

Accordingly, it is intended by the appended claims to cover all modifications which fall within the true spirit and scope of the present invention.

The invention claimed is:

1. A method comprising:
   transmitting an image sequence that is compressed based on a plurality of foveation zones, wherein a first foveation zones of the plurality of foveation zones corresponds to a first view location and a second foveation zone of the plurality of foveation zones corresponds to a second view location;
   wherein during a portion of the image sequence, the first and second view locations occur concurrently.

2. The method of claim 1, further comprising:
   compressing the image sequence based on the plurality of foveation zones.

3. The method of claim 2, further comprising:
   determining view locations within the plurality of foveation zones for a sample of viewers.

4. The method of claim 2, further comprising:
   estimating a probability of a viewer looking at the first view location and the second view location based at least in part on a scene type occurring during the portion of the image sequence where the first and second view locations occur concurrently; and
   weighting at least the first and second foveation zones based on the probability.

5. The method of claim 1 wherein each of the plurality of foveation zones is definable by a continuous falloff function.

6. The method of claim 1 wherein each of the plurality of foveation zones has a corresponding half-resolution constant based on a probability of a viewer looking at the view location corresponding the foveation zone.

7. The method of claim 6 wherein the probability of a viewer looking at the first view location corresponding to the first foveation zone is greater than the probability of a viewer looking at the second view location corresponding to the second foveation zone, and wherein the half-resolution constant of the first foveation zone is greater than the half-resolution constant of the second foveation zone.

8. The method of claim 1 wherein each of the plurality of foveation zones is definable by a discrete function.

9. The method of claim 1 wherein each of the plurality of foveation zones has a corresponding fixed resolution based on a probability of a viewer looking at a view location corresponding to the foveation zone.

10. A computer-readable medium having computer-readable instructions to direct a computer to perform an act of:
    transmitting an image sequence that is compressed based on a plurality of foveation zones, wherein a first foveation zones of the plurality of foveation zones corresponds to a first view location and a second foveation zone of the plurality of foveation zones corresponds to a second view location;
    wherein during a portion of the image sequence, the first and second view locations occur concurrently.

11. The computer-readable medium of claim 10, further comprising computer-readable instructions to direct the computer to perform an act of:
    compressing the image sequence based on the plurality of foveation zones.

12. The computer-readable medium of claim 11 wherein the computer-readable instructions further direct the computer to perform acts of:
    estimating a probability of a viewer looking at the first view location and the second view location based at least in part on a scene type occurring during the portion of the image sequence where the first and second view locations occur concurrently; and
    weighting at least the first and second foveation zones based on the probability.

13. An apparatus operable to transmit an image sequence that is compressed based on a plurality of foveation zones, wherein a first foveation zones of the plurality of foveation zones corresponds to a first view location and a second foveation zone of the plurality of foveation zones corresponds to a second view location;
    wherein during a portion of the image sequence, the first and second view locations occur concurrently.

14. The apparatus of claim 13, wherein the apparatus is further operable to compress the image sequence based on the plurality of foveation zones.

15. The apparatus of claim 14, wherein the apparatus comprises:
    at least one eye tracking device to determine view locations for a sample of viewers; and
    a processor responsive to the at least one eye tracking device to determine the plurality of foveation zones based on the view locations, to estimate a probability of a viewer looking at the view locations, and to weight each of the foveation zones based on the probability of the viewer looking at the view locations.

* * * * *

UNITED STATES PATENT AND TRADEMARK OFFICE
CERTIFICATE OF CORRECTION

PATENT NO. : 7,406,207 B2  Page 1 of 1
APPLICATION NO. : 11/820696
DATED : July 29, 2008
INVENTOR(S) : Philip T. Kortum et al.

It is certified that error appears in the above-identified patent and that said Letters Patent is hereby corrected as shown below:

<u>In the Claims</u>

In column 5, claim 1, line 35, before "of the plurality of" delete "zones" and substitute --zone-- in its place.

In column 6, claim 10, line 18, before "of the plurality of" delete "zones" and substitute --zone-- in its place.

In column 6, claim 13, line 41, after "wherein a first foveation" delete "zones" and substitute --zone-- in its place.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,406,207 B2 | Page 1 of 1 |
| APPLICATION NO. | : 11/820696 | |
| DATED | : July 29, 2008 | |
| INVENTOR(S) | : Kortum et al. | |

It is certified that error appears in the above-identified patent and that said Letters Patent is hereby corrected as shown below:

Title Page, Item (56), under "OTHER PUBLICATIONS", in Column 2, Line 3, delete "vol 28, No 2," and insert -- vol. 28, No. 2, --, therefor.

On Title Page 2, Item (56), under "U.S. PATENT DOCUMENTS", in Column 2, Line 1, delete "2002/0064317" and insert -- 2002/0064314 --, therefor.

In Column 1, Line 9, delete "7,251,373 which" and insert -- 7,251,373, which --, therefor.

In Column 1, Line 11, delete "7,010,169 the" and insert -- 7,010,169, the --, therefor.

Signed and Sealed this
Fourteenth Day of August, 2012

David J. Kappos
*Director of the United States Patent and Trademark Office*